(12) United States Patent
Sutivong et al.

(10) Patent No.: US 7,594,151 B2
(45) Date of Patent: Sep. 22, 2009

(54) REVERSE LINK POWER CONTROL IN AN ORTHOGONAL SYSTEM

(75) Inventors: Arak Sutivong, San Diego, CA (US); Avneesh Agrawal, San Diego, CA (US)

(73) Assignee: QUALCOMM, Incorporated, San Diego, CA (US)

( * ) Notice: Subject to any disclaimer, the term of this patent is extended or adjusted under 35 U.S.C. 154(b) by 574 days.

(21) Appl. No.: 11/022,348

(22) Filed: Dec. 22, 2004

(65) Prior Publication Data

US 2006/0002346 A1 Jan. 5, 2006

Related U.S. Application Data

(60) Provisional application No. 60/589,823, filed on Jul. 20, 2004, provisional application No. 60/580,819, filed on Jun. 18, 2004.

(51) Int. Cl.
*H04L 1/18* (2006.01)
(52) U.S. Cl. .................................................. 714/748
(58) Field of Classification Search .................. 714/748, 714/749, 18; 370/245
See application file for complete search history.

(56) References Cited

U.S. PATENT DOCUMENTS

| 5,267,262 | A | 11/1993 | Wheatley, III |
|---|---|---|---|
| 5,406,613 | A | 4/1995 | Peponides et al. |
| 5,815,507 | A | 9/1998 | Vinggaard et al. |
| 6,012,160 | A | 1/2000 | Dent |
| 6,038,220 | A | 3/2000 | Kang et al. |
| 6,047,189 | A | 4/2000 | Yun et al. |
| 6,144,841 | A | 11/2000 | Feeney |
| 6,154,659 | A | 11/2000 | Jalali et al. |
| 6,181,738 | B1 | 1/2001 | Chheda et al. |
| 6,208,699 | B1 | 3/2001 | Chen et al. |
| 6,446,236 | B1 | 9/2002 | McEwen et al. |
| 6,519,705 | B1 | 2/2003 | Leung |
| 6,560,774 | B1 | 5/2003 | Gordon et al. |
| 6,574,211 | B2 * | 6/2003 | Padovani et al. ............ 370/347 |
| 6,597,705 | B1 | 7/2003 | Rezaiifar et al. |
| 6,597,923 | B1 | 7/2003 | Vanghi et al. |
| 6,603,746 | B1 | 8/2003 | Larajani et al. |
| 6,628,956 | B2 | 9/2003 | Bark et al. |
| 6,711,150 | B1 | 3/2004 | Vanghi |

(Continued)

FOREIGN PATENT DOCUMENTS

CA 2340201 4/2006

(Continued)

OTHER PUBLICATIONS

Damnjanovic and Vanghi, "IS-2000 Enhanced Closed Loop Power Control for Turbo Coding," IEEE 54th Vehicular Technology Proceedings, Oct. 7-11, 2001, pp. 2314-2318 XP-010562383.

(Continued)

*Primary Examiner*—Shelly A Chase
(74) *Attorney, Agent, or Firm*—Mary Fales (57) ABSTRACT

A closed-loop reverse-link power control algorithm for a frequency hopping orthogonal frequency division multiple access (FH-OFDMA) system is described. The power control algorithm adjusts the user's transmit power based on effective carrier-to-interference (C/I) and Received-Power-Over-Thermal (RpOT) measurements. The algorithm is inherently stable and is effective for FH-OFDMA systems with retransmissions.

25 Claims, 4 Drawing Sheets

U.S. PATENT DOCUMENTS

| | | | |
|---|---|---|---|
| 6,721,373 | B1 | 4/2004 | Frenkel et al. |
| 6,807,164 | B1 | 10/2004 | Almgren et al. |
| 6,950,669 | B2 | 9/2005 | Simonsson |
| 6,952,591 | B2 | 10/2005 | Budka et al. |
| 7,224,993 | B2 | 5/2007 | Meyers et al. |
| 2001/0040880 | A1 | 11/2001 | Chen et al. |
| 2002/0018446 | A1* | 2/2002 | Huh et al. .................. 370/245 |
| 2003/0081538 | A1 | 5/2003 | Walton et al. ............... 370/206 |
| 2004/0077370 | A1 | 4/2004 | Dick et al. |
| 2004/0203455 | A1* | 10/2004 | Bao et al. ................ 455/67.13 |

FOREIGN PATENT DOCUMENTS

| | | |
|---|---|---|
| EP | 0955736 | 11/1999 |
| RU | 2198465 | 2/2003 |
| WO | 0014900 | 3/2000 |
| WO | 0120808 | 3/2001 |
| WO | 0182504 | 11/2001 |
| WO | WO2004/025869 A2 | 3/2004 |

OTHER PUBLICATIONS

International Search Report—PCT/US05/025803, International Search Authority—European Patent Office—Nov. 15, 2005 (for 040151).

Written Opinion—PCT/US05/025803, International Search Authority—European Patent Office—Nov. 15, 2005 (for 040151).

International Preliminary Examination Report—PCT/US05/025803, International Search Authority—European Patent Office—Nov. 15, 2005 (for 040151).

TIA/EIA/IS-95 "Mobile Station-Base Station Compatibility Standard for Dual-Mode Wideband Spread Spectrum Cellular System" Jul. 1993.

* cited by examiner

REVERSE LINK POWER CONTROL IN AN ORTHOGONAL SYSTEM

CLAIM OF PRIORITY UNDER 35 U.S.C. §119

The present Application for Patent claims priority to Provisional Application No. 60/580,819 entitled "FH-OFDMA Reverse-Link Power Control" filed Jun. 18, 2004, and assigned to the assignee hereof and hereby expressly incorporated by reference herein. The present Application also claims priority to Provisional Application No. 60/589,823 entitled "FH-OFDMA Reverse-Link Power Control" filed Jul. 20, 2004.

REFERENCE TO CO-PENDING APPLICATIONS FOR PATENT

The present Application for Patent is related to the following co-pending U.S patent application: "Robust Erasure Detection and Erasure-Rate-Based Closed Loop Power Control" filed Jul. 13, 2004, U.S. patent application Ser. No. 10/890,717, assigned to the assignee hereof, and expressly incorporated by reference herein.

The present Application for Patent is related to the following co-pending U.S. patent application: "Power Control For a Wireless Communication System Utilizing Orthogonal Multiplexing" filed Jul. 22, 2004, U.S. patent application Ser. No. 10/897,463, assigned to the assignee hereof, and expressly incorporated by reference herein

BACKGROUND

I. Field

The present invention relates generally to communications, and more specifically to techniques for determining reverse link power control in an orthogonal communication system.

II. Background

In Frequency-Hopping Orthogonal Frequency Division Multiple Access (FH-OFDMA) system, bandwidth is evenly divided into a number of orthogonal sub-carriers. Each user is given a number of these OFDM sub-carriers. In FH-OFDMA, users will also be hopping (i.e., the subset of OFDM carriers assigned to each user changes over time) across the whole bandwidth. All users within the same sector or cell are orthogonal to each other and hence cause no interference to each other.

FH-OFDMA is an efficient multiplexing technique for high data rate transmission over wireless channels. However, due to a wide variation in the received Signal-to-Noise Ratio (SNR) in an FH-OFDMA system, it is highly resource-inefficient to ensure a small packet error rate on every transmission. A packet retransmission mechanism (e.g., H-ARQ) is often used to help avoid such inefficiency.

In addition, a closed-loop power control is often employed to ensure that sufficient SNR (i.e., SNR required to close the communication link) is received at the base station. There is an inherent tradeoff between number of (re)transmissions allowed and transmit power required for a successful transmission. For instance, by increasing the transmit power level; the number of transmissions required for a successful transmission can be decreased, which directly results in a higher data rate. Or, the transmit power required for a successful transmission can be decreased if the number of (re)transmissions allowed increases. This inherent tradeoff between rate and power adaptation makes the design of a power control loop for a system with retransmissions a nontrivial task.

There is therefore a need in the art for techniques that trade off rate and power in an effective manner taking into account retransmissions.

SUMMARY

In an aspect, a method of reverse link power control comprises transmitting a packet, determining whether the packet has been received without error, decreasing an effective carrier-to-interference (C/I) setpoint if the packet has been received without error, and increasing the effective C/I setpoint if the packet has not been received without error.

In an aspect, a method of reverse link power control further comprises determining whether a Received Power Over Thermal (RpOT) is less than a maximum Received Power Over Thermal ($RpOT_{max}$). In an aspect, a method of reverse link power control further comprises issuing a down command if the RpOT is not greater than the $RpOT_{max}$.

In an aspect, a method of reverse link power control further comprises determining whether an effective carrier-to-interference ratio (C/I) is less than an effective carrier-to-interference ratio for the setpoint ($C/I_{sp}$). In an aspect, a method of reverse link power control further comprises determining whether a Received Power Over Thermal (RpOT) is less than a minimum Received Power Over Thermal ($RpOT_{min}$).

In an aspect, a method of reverse link power control further comprises issuing a down command if the effective carrier-to-interference ratio (C/I) is not less than the effective carrier-to-interference ratio for the setpoint ($C/I_{sp}$) or the Received Power Over Thermal (RpOT) is not less than the minimum Received Power Over Thermal ($RpOT_{min}$).

In an aspect, a method of reverse link power control further comprises issuing a up command if the effective carrier-to-interference ratio (C/I) is less than the effective carrier-to-interference ratio for the setpoint ($C/I_{sp}$) and the Received Power Over Thermal (RpOT) is less than the minimum Received Power Over Thermal ($RpOT_{min}$).

In an aspect, the steps of determining whether the packet has been received without error, decreasing an effective carrier-to-interference (C/I) setpoint if the packet has been received without error, and increasing the effective C/I setpoint if the packet has not been received without error comprise an outer loop power control.

In an aspect, method of reverse link power control further comprises disabling the outer loop power control if the Received Power Over Thermal (RpOT) is less than or equal to the minimum Received Power Over Thermal ($RpOT_{min}$) or if the Received Power Over Thermal (RpOT) is greater than or equal to the maximum Received Power Over Thermal $RpOT_{max}$.

In an aspect, method of reverse link power control further comprises enabling the outer loop power control if the Received Power Over Thermal (RpOT) is greater than the minimum Received Power Over Thermal ($RpOT_{min}$) and the Received Power Over Thermal (RpOT) is less than the maximum Received Power Over Thermal $RpOT_{max}$.

In an aspect, a wireless communications device comprises means for transmitting a packet, means for determining whether the packet has been received without error, means for decreasing an effective carrier-to-interference (C/I) setpoint if the packet has been received without error, and means for increasing the effective C/I setpoint if the packet has not been received without error.

In an aspect, a processor is programmed to execute a method of estimating interference in a wireless communication system, the method comprising transmitting a packet, determining whether the packet has been received without error, decreasing an effective carrier-to-interference (C/I) setpoint if the packet has been received without error, and increasing the effective C/I setpoint if the packet has not been received without error.

In an aspect, a computer readable media embodying a method of reverse link power control, the method comprises transmitting a packet, determining whether the packet has been received without error, decreasing an effective carrier-to-interference (C/I) setpoint if the packet has been received without error, and increasing the effective C/I setpoint if the packet has not been received without error.

Various aspects and embodiments of the invention are described in further detail below.

BRIEF DESCRIPTION OF THE DRAWINGS

The features and nature of the present invention will become more apparent from the detailed description set forth below when taken in conjunction with the drawings in which like reference characters identify correspondingly throughout and wherein.

DETAILED DESCRIPTION

The word "exemplary" is used herein to mean "serving as an example, instance, or illustration." Any embodiment or design described herein as "exemplary" is not necessarily to be construed as preferred or advantageous over other embodiments or designs.

The techniques described herein for performance based rank prediction may be used for various communication systems such as a Code Division Multiple Access (CDMA) system, a Wideband CDMA (WCDMA) system, a direct sequence CDMA (DS-CDMA) system, a Time Division Multiple Access (TDMA) system, a Frequency Division Multiple Access (FDMA) system, a High Speed Downlink Packet Access (HSDPA) system, an orthogonal frequency division multiplexing (OFDM)-based system, an Orthogonal Frequency Division Multiple Access (OFDMA) system, a single-input single-output (SISO) system, a multiple-input multiple-output (MIMO) system, and so on.

OFDM is a multi-carrier modulation technique that effectively partitions the overall system bandwidth into multiple (NF) orthogonal subbands. These subbands are also referred to as tones, subcarriers, bins, and frequency channels. With OFDM, each subband is associated with a respective subcarrier that may be modulated with data. Up to NF modulation symbols may be transmitted on the NF subbands in each OFDM symbol period. Prior to transmission, these modulation symbols are transformed to the time-domain using an NF-point inverse fast Fourier transform (IFFT) to obtain a "transformed" symbol that contains NF chips.

An OFDMA system utilizes OFDM and can support multiple users simultaneously. For a frequency hopping OFDMA system, data for each user is transmitted using a specific frequency hopping (FH) sequence assigned to the user. The FH sequence indicates the specific subband to use for data transmission in each hop period. Multiple data transmissions for multiple users may be sent simultaneously using different FH sequences. These FH sequences are defined to be orthogonal to one another so that only one data transmission uses each subband in each hop period. By using orthogonal FH sequences, intra-cell interference is avoided, and the multiple data transmissions do not interfere with one another while enjoying the benefits of frequency diversity.

Typically, a power control loop can be broken into two parts: an inner loop and an outer loop. A base station issues an UP/DOWN power control command as dictated by an inner loop to regulate the user's transmit power such that the, desired quantity (such as received signal power, signal-to-interference-and-noise ratio (SINR), etc.) set by the power control outer loop is maintained. The outer loop dynamically adjusts this set-point so that the specified quality-of-service (QoS) is met, irrespective of the changing channel conditions.

IS-95 and CDMA2000 use a packet error rate (PER) as a QoS metric of choice. In essence, the power control loop regulates the transmit power such that the PER is near the target setpoint (e.g. 1%). However, there are several shortcomings with such an algorithm when applied to systems with retransmissions.

For example, consider a best-effort application, where a packet error is declared only when a packet has not been received correctly after the maximum number of transmissions allowed is reached. A Packet-Error-Rate-based (PER-based) power control algorithm attempts to minimize the transmit power while trying to maintain the target packet error rate. As the maximum number of transmissions allowed increases, the required transmit power decreases (assuming the packet size remains the same). Although the users transmit power has decreased, throughput has also decreased.

Interestingly, in a CDMA system, although each individual user's throughput decreases, the sector throughput can remain unchanged (or may even increase), as more users are added to the system (recall that in a CDMA system, less interference leads to higher number of supportable users). Unfortunately, systems that employ orthogonal multiple access techniques (e.g., TDMA, FDMA, and OFDMA) on the reverse link will suffer an overall sector throughput loss with this power control scheme.

In orthogonal systems, when all the dimensions have been used, additional users cannot be added without destroying orthogonality between the users. Thus, adding more users does not necessarily help make up for the sector throughput loss caused by the reduction in each individual user's throughput in an orthogonal system.

Figure 1:
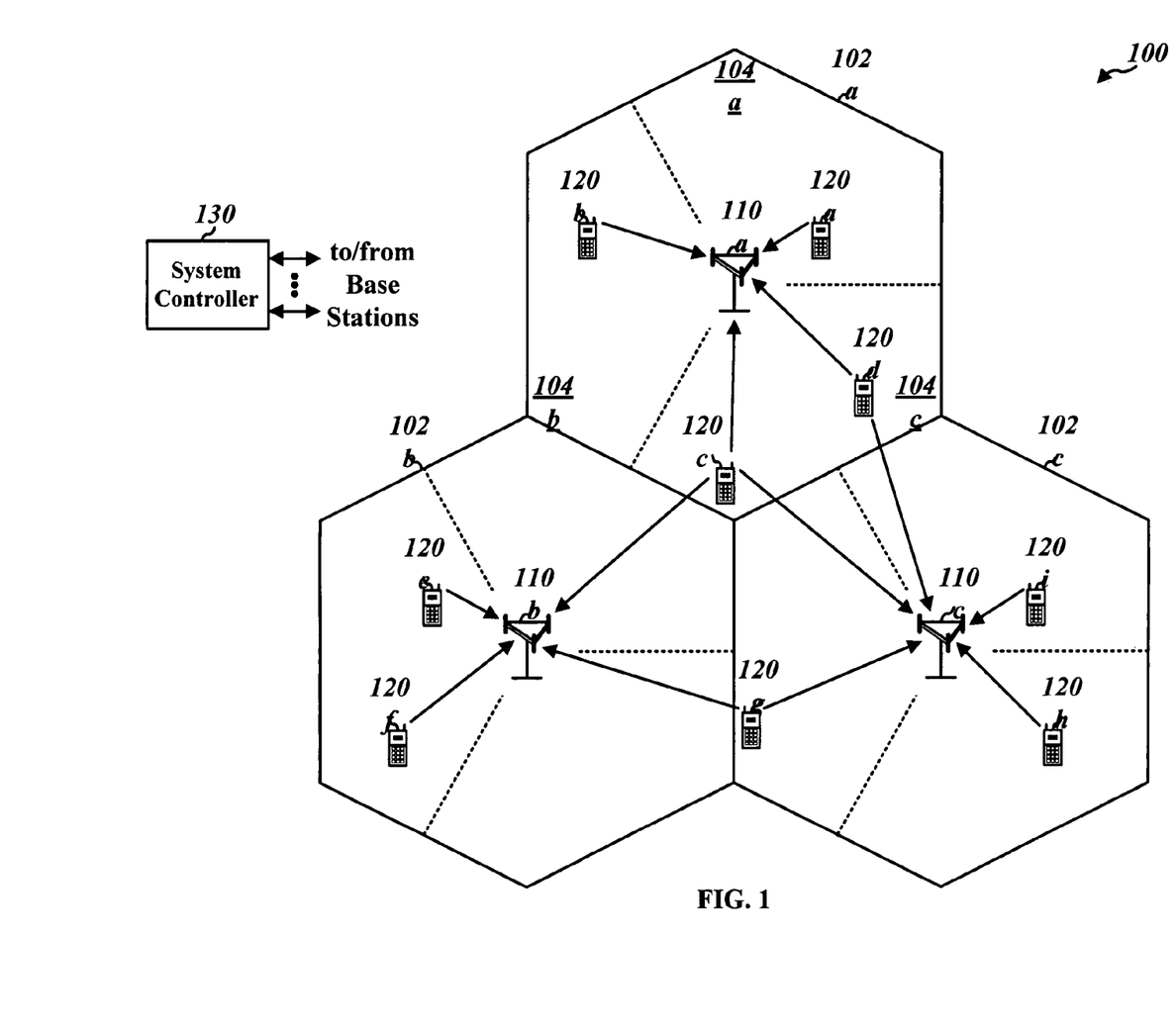
FIG. 1 shows a wireless multiple-access communication system 100 in accordance with an embodiment.

FIG. 1 shows a wireless multiple-access communication system 100 in accordance with an embodiment. System 100 includes a number of base stations 110 that support communication for a number of wireless terminals 120. A base station is a fixed station used for communicating with the terminals and may also be referred to as an access point, a Node B, or some other terminology. A cell 102, typically drawn as a hexagon for exemplary purposes, defines a coverage area for terminals associated with a cell site or base station as is well known in the art. The cell can be divided into sectors 104. Terminals 120 are typically dispersed throughout the system, and each terminal may be fixed or mobile. A terminal may also be referred to as a mobile station, a user equipment (UE), a wireless communication device, or some other terminology. Each terminal may communicate with one or more base stations on the forward and reverse links at any given moment. This depends on whether the terminal is active, whether soft handoff is supported, and whether the terminal is in soft handoff. For simplicity, FIG. 1 only shows transmissions on the reverse link. A system controller 130 couples to base stations 110, provides coordination and control for these base stations, and further controls the routing of data for the terminals served by these base stations.

A closed-loop power control scheme for an FH-OFDMA system with hybrid-ARQ (H-ARQ) is described below in accordance with an embodiment. It would be apparent to those skilled in the art that the algorithm described below can be easily modified to work with any orthogonal systems (e.g., TDMA, FDMA) that employ retransmissions.

This algorithm is designed to work well for both best-effort traffic (e.g., ftp, download, etc.) and latency-sensitive Constant Bit Rate (CBR) traffic (e.g., voice, multimedia, etc.). For best-effort traffic, the proposed algorithm mitigates the problem of rate loss due to coupling between power control and H-ARQ. For latency-sensitive CBR traffic, the proposed power control algorithm attempts to minimize the user's transmit power while still satisfying the packet error rate and latency constraint. The same underlying power control algorithm and interface can be used for both best-effort and latency-sensitive CBR traffic.

Figure 2:
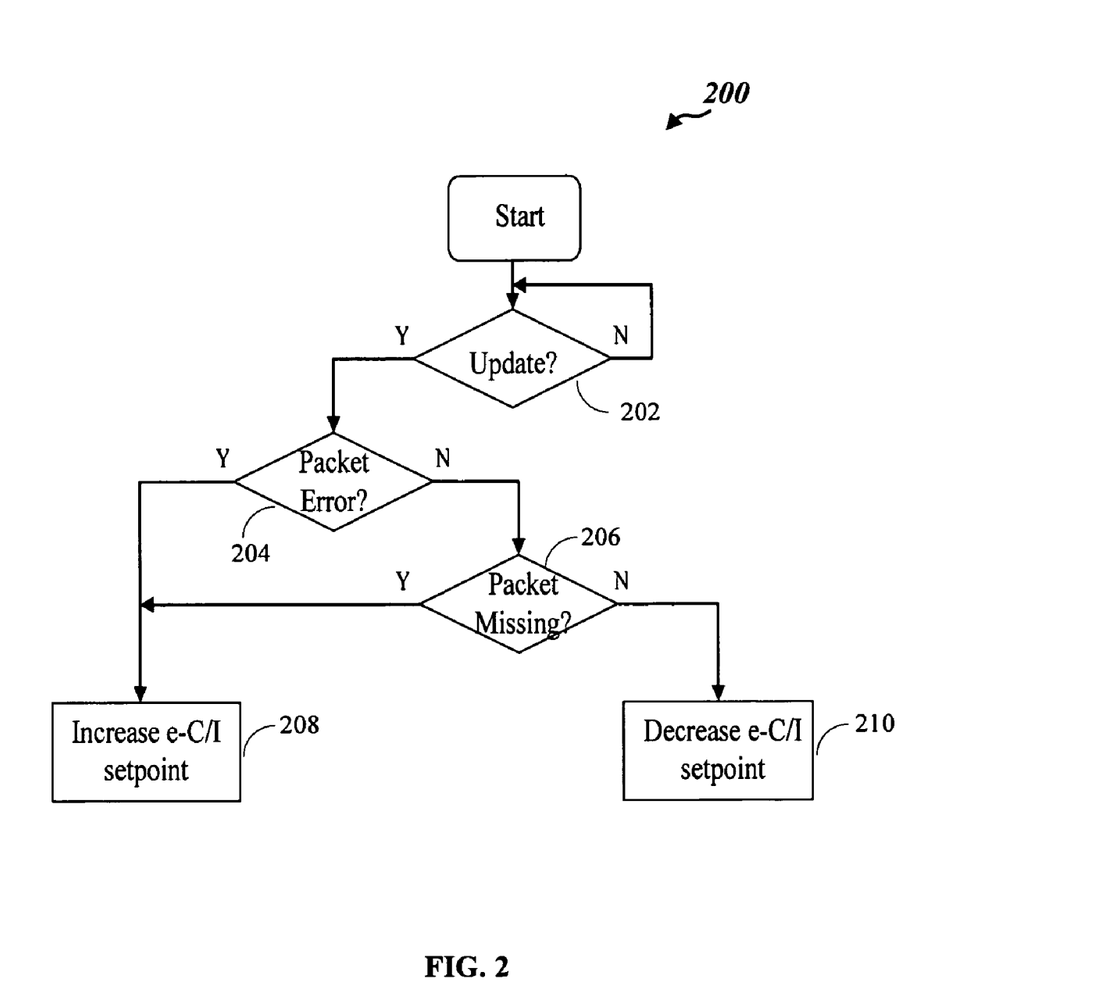
FIG. 2 shows a flowchart of an outer loop power control in accordance with an embodiment.

FIG. 2 shows a flowchart 200 of an outer loop power control in accordance with an embodiment. The goal of the outer loop is to set a target effective carrier-to-interference (C/I) for an inner loop to track. An effective C/I is used instead of, for instance, an average C/I. Effective C/I is a better measure of the channel condition than average C/I in an FH-OFDMA system. "Effective SNR" is (approximately) proportional to the geometric mean of the SNRs averaged over all tones.

The outer loop is updated when (i) there is a packet error or (ii) a packet is decoded correctly. Because of retransmissions, the outer-loop may not be updated every packet arrival instance.

A packet is considered in error if it has not been successfully decoded after the specified maximum number of transmissions is reached or if its latency exceeds a specified latency limit. Latency includes both queuing delay and transmission delay.

By declaring packets with latency higher than the maximum latency allowed as packet errors, a latency constraint is seamlessly incorporated into the power control loop. The rationale behind this is that in most real-time applications, late packets are simply discarded since as far as a user's perception is concerned, a corrupted packet or a late-arriving packet is more or less equally detrimental. In addition, packets may be dropped at the transmitter to help regulate packet latency further (because it does not make sense to transmit packets whose latency has already exceeded the limit, as they will be discarded by the receiver anyway).

The receiver can detect that some packets have been dropped at the transmitter by detecting that packets are received out of sequence. These missing packets (once detected) are treated as packet errors. Missing packets can only be detected once the next packet in the sequence is decoded correctly at the receiver. In essence, corrupted packets, dropped packets and packets with excessive latency are declared as packet errors and the outer loop dynamically adjusts the effective C/I setpoint to maintain the packet error rate at a target value. By choosing the step sizes in adjusting the effective C/I setpoint properly, the target PER can be controlled to a desired value.

In step 202, a check is made to determine whether the setpoint is to be updated. If not, then the flow of control goes back to step 202 on the next iteration. If the setpoint is to be updated, then the flow of control proceeds to step 204.

In step 204, a check is made to determine whether there is a packet error. If there is no packet error, then the flow of control proceeds to step 206. Otherwise, the flow of control proceeds to step 208.

In step 206, a check is made to determine whether a packet is missing. If the packet is missing, then the flow of control proceeds to step 208 and the effective C/I setpoint is increased. Otherwise, the flow of control proceeds to step 210 and the effective C/I setpoint is decreased.

Figure 3:
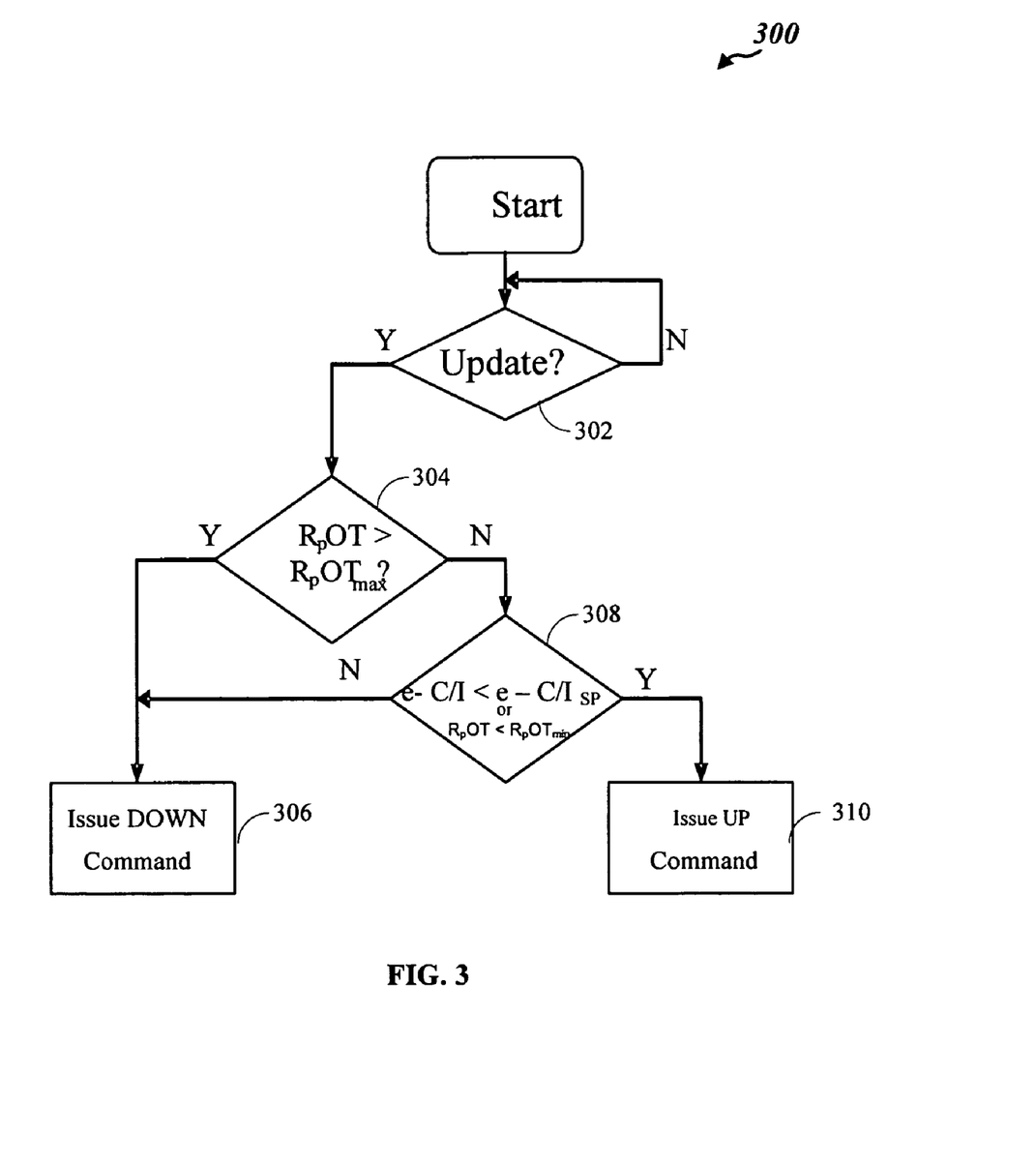
FIG. 3 shows a flowchart of an inner loop power control in accordance with an embodiment.

The base station then issues an UP/DOWN power control command (e.g., ±1 dB) using an inner loop, as shown in FIG. 3. FIG. 3 shows a flowchart 300 of an inner loop power control in accordance with an embodiment.

The outer loop can be disabled when data is not present. Thus, only inner loop control is enabled when data is not present.

The inner loop is updated periodically (e.g., every few hops/slots). The base station measures the received signal power and the effective C/I over the measurement interval. The inner loop attempts to maintain the target effective C/I set by the outer loop, while still satisfying a $R_pOT$ constraint (i.e., operating $R_pOT$ should be between $R_pOT$min and $R_pOT$max). The Received Power Over Thermal ($R_pOT$) is defined as the ratio between the received signal power (P) and thermal noise ($N_0$). The inner loop of this proposed algorithm tries to satisfy both the effective C/I and $R_pOT$ targets.

Set points (e-$C/I_{sp}$, $R_pOT_{min}$, $R_pOT_{max}$) are user specific. Different Quality of Service (QoS) users may have different $RpOT_{min,max}$ constraints. Updates are also user specific.

$R_pOT_{min}$ and $R_pOT_{max}$ can be determined according to QoS. $R_pOT_{min}$ and $R_pOT_{max}$ can be set equal to each other.

Although not reflected in the figures, when the RpOT limit (i.e., either $R_pOT$min or $R_pOT$max ) is reached, the outer loop update is disabled in accordance with an embodiment. This is to prevent the effective C/I setpoint from being incremented or decremented indefinitely.

There are two benefits in incorporating $R_pOT$ into power control design. First, since $R_pOT$ does not depend on interference power from other users, by regulating the transmit power based on $R_pOT$, the power control loop is inherently stable (i.e., no indefinite power race between users). Second, by putting a constraint on the operating range of $R_pOT$, transmit power can be traded off for data rate.

Without the additional constraint on the $R_pOT$ operating range, the power control loop may drive the transmit power to a very low level, as it may be all that is needed to satisfy the specified packet error rate requirement. This leads to a lower throughput, as discussed previously. By enforcing the operating range of $R_pOT$, users can essentially choose to tradeoff between data rate and transmit power (e.g., users can enjoy a higher rate from an early termination by transmitting at higher power). In effect, $R_pOT$min helps protect against unnecessary rate loss, while $R_pOT$max helps ensure stable operation.

By setting $R_pOT$min=$R_pOT$max, the outer loop is essentially disabled. Effectively, the base station regulates the user's transmit power such that the target $R_pOT$ is met. This setting may be used in supporting best-effort traffic, where a user can always benefit from having a higher data rate.

In step 302, a check is made to determine whether the inner loop is to be updated. If not, then the flow of control goes back to step 302 on the next iteration. If the inner loop is to be updated, then the flow of control proceeds to step 304.

In step 304, a check is made to determine whether $R_pOT>R_pOT$max. If yes, then the flow of control proceeds to step 306 and a DOWN command is issued by the base station. If not, then the flow of control proceeds to step 308.

In step 308, a check is made to determine whether an effective C/I is less than an effective C/I$_{sp}$ or R$_p$OT<R$_p$OT$_{min}$. Effective C/I$_{sp}$ is the effective C/I for a setpoint. If yes, then the flow of control proceeds to step 310 and the base station issues an UP command. If no, then the flow of control proceeds to step 306 and the base station issues a DOWN command.

In an embodiment, a hysteresis function is added to the update functions of the outer and inner loops 200, 300 of FIGS. 2 and 3, respectively. The hysteresis function helps prevent the system from getting into a limit cycle.

In an embodiment, a packet error automatically results in an UP command to speed up the recovery (assuming, of course, that the R$_p$OT constraint is not violated).

In an embodiment, when only a control channel is present, the outer loop is disabled while continuing to execute the inner loop. When a data channel comes back, the operation of the outer loop can seamlessly be resumed. Thus, same underlying power control loop is used for both the control and data channels.

Figure 4:
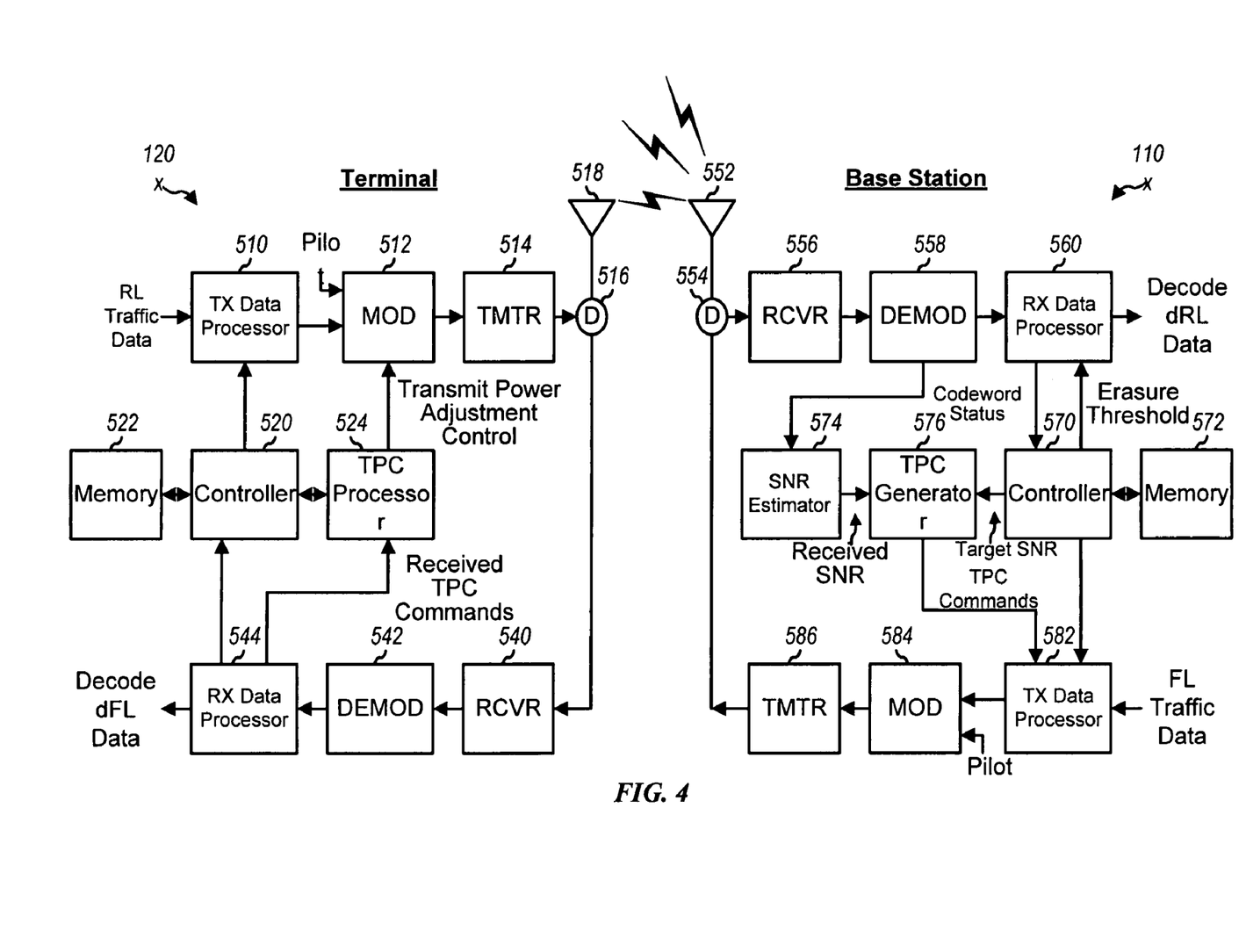
FIG. 4 shows a block diagram of a terminal and a base station.

FIG. 4 shows a block diagram of an embodiment of a base station 110x and a terminal 120x. On the reverse link, at terminal 120x, a transmit (TX) data processor 510 receives and processes (e.g., formats, codes, interleaves, and modulates) reverse link (RL) traffic data and provides modulation symbols for the traffic data. TX data processor 510 also processes control data (e.g., CQI) from a controller 520 and provides modulation symbols for the control data. A modulator (MOD) 512 processes the modulation symbols for traffic and control data and pilot symbols and provides a sequence of complex-valued chips. The processing by TX data processor 510 and modulator 512 is dependent on the system. For example, modulator 512 may perform OFDM modulation if the system utilizes OFDM. A transmitter unit (TMTR) 514 conditions (e.g., converts to analog, amplifies, filters, and frequency upconverts) the sequence of chips and generates a reverse link signal, which is routed through a duplexer (D) 516 and transmitted via an antenna 518.

At base station 110x, the reverse link signal from terminal 120x is received by an antenna 552, routed through a duplexer 554, and provided to a receiver unit (RCVR) 556. Receiver unit 556 conditions (e.g., filters, amplifies, and frequency downconverts) the received signal and further digitizes the conditioned signal to obtain a stream of data samples. A demodulator (DEMOD) 558 processes the data samples to obtain symbol estimates. A receive (RX) data processor 560 then processes (e.g., deinterleaves and decodes) the symbol estimates to obtain decoded data for terminal 120x. RX data processor 560 also performs erasure detection and provides to a controller 570 the status of each received codeword used for power control. The processing by demodulator 558 and RX data processor 560 is complementary to the processing performed by modulator 512 and TX data processor 510, respectively.

The processing for a forward link transmission may be performed similarly to that described above for the reverse link. The processing for reverse link and forward link transmissions is typically specified by the system.

For reverse link power control, an SNR estimator 574 estimates the received SNR for terminal 120x and provides the received SNR to a TPC generator 576. TPC generator 576 also receives the target SNR and generates TPC commands for terminal 120x. The TPC commands are processed by a TX data processor 582, further processed by a modulator 584, conditioned by a transmitter unit 586, routed through duplexer 554, and transmitted via antenna 552 to terminal 120x.

At terminal 120x, the forward link signal from base station 110x is received by antenna 518, routed through duplexer 516, conditioned and digitized by a receiver unit 540, processed by a demodulator 542, and further processed by an RX data processor 544 to obtain received TPC commands. A TPC processor 524 then detects the received TPC commands to obtain TPC decisions, which are used to generate a transmit power adjustment control. Modulator 512 receives the control from TPC processor 524 and adjusts the transmit power for the reverse link transmission. Forward link power control may be achieved in a similar manner.

Controllers 520 and 570 direct the operations of various processing units within terminal 120x and base station 110x, respectively. Controller 520 and 570 may also perform various functions for erasure detection and power control for the forward link and reverse link. For example, each controller may implement the SNR estimator, TPC generator, and target SNR adjustment unit for its link. Controller 570 and RX data processor 560 may also implement processes 200 and 300 in FIGS. 2 and 3. Memory units 522 and 572 store data and program codes for controllers 520 and 570, respectively.

The erasure detection and power control techniques described herein may be implemented by various means. For example, these techniques may be implemented in hardware, software, or a combination thereof. For a hardware implementation, the processing units used to perform erasure detection and/or power control may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

For a software implementation, the techniques described herein may be implemented with modules (e.g., procedures, functions, and so on) that perform the functions described herein. The software codes may be stored in a memory unit (e.g., memory unit 572 in FIG. 5) and executed by a processor (e.g., controller 570). The memory unit may be implemented within the processor or external to the processor, in which case it can be communicatively coupled to the processor via various means as is known in the art.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method of reverse link power control, comprising:
transmitting a packet;
determining whether the packet has been received without error;
decreasing an effective carrier-to-interference (C/I) setpoint if the packet has been received without error;
increasing the effective C/I setpoint if the packet has not been received without error; and
regulating the transmit (TX) power based on a Received Power Over Thermal (RpOT) and the effective C/I setpoint.

2. The method of claim 1, wherein
determining whether the packet has been received without error involves determining that there is no packet error and that the packet is not missing.

3. The method of claim 2 further comprising:
transmitting a negative acknowledgment (NACK) messages for data packets not received.

4. The method of claim 3 further comprising:
retransmitting said data packets not received in accordance with said NACK messages.

5. The method of claim 3, wherein said data packets are transmitted over one or more time slots.

6. A method of reverse link power control, comprising:
transmitting a packet;
determining whether the racket has been received without error;
decreasing an effective carrier-to-interference (C/I) setpoint if the packet has been received without error;
increasing the effective C/I setpoint if the packet has not been received without error; and
determining whether a Received Power Over Thermal (RpOT) is greater than a maximum Received Power Over Thermal ($RpOT_{max}$).

7. The method of claim 6, wherein the Received Power Over Thermal (RpOT) is the ratio between the received signal power and thermal noise.

8. The method of claim 6, further comprising issuing a down command if the RpOT is greater than the $RpOT_{max}$.

9. The method of claim 6, further comprising determining whether an effective carrier-to-interference ratio (C/I) is less than an effective carrier-to-interference ratio for the setpoint ($C/I_{sp}$).

10. The method of claim 9, further comprising determining whether a Received Power Over Thermal (RpOT) is less than a minimum Received Power Over Thermal ($RpOT_{min}$).

11. The method of claim 10, further comprising issuing a down command if the effective carrier-to-interference ratio (C/I) is not less than the effective carrier-to-interference ratio for the setpoint ($C/I_{sp}$) or the Received Power Over Thermal (RpOT) is not less than the minimum Received Power Over Thermal ($RpOT_{min}$).

12. The method of claim 10, further comprising issuing an up command if the effective carrier-to-interference ratio (C/I) is less than the effective carrier-to-interference ratio for the setpoint ($C/I_{sp}$) and the Received Power Over Thermal (RpOT) is less than the minimum Received Power Over Thermal ($RpOT_{min}$).

13. The method of claim 1, wherein the steps of
determining whether the packet has been received without error;
decreasing an effective carrier-to-interference (C/I) setpoint if the packet has been received without error; and
increasing the effective C/I setpoint if the packet has not been received without error comprise an outer loop power control.

14. A method of reverse link power control, comprising:
transmitting a packet;
determining whether the packet has been received without error;
decreasing an effective carrier-to-interference (C/I) setpoint if the packet has been received without error; and
increasing the effective C/I setpoint if the packet has not been received without error,
wherein the determining, decreasing and increasing steps comprise an outer loop power control, and
wherein the outer loop power control is disabled if the Received Power Over Thermal (RpOT) is less than or equal to the minimum Received Power Over Thermal ($RpOT_{min}$).

15. A method of reverse link power control, comprising:
transmitting a packet;
determining whether the packet has been received without error;
decreasing an effective carrier-to-interference (C/I) setpoint if the packet has been received without error; and
increasing the effective C/I setpoint if the packet has not been received without error,
wherein the determining, decreasing and increasing steps comprise an outer loop power control, and
wherein the outer loop power control is disabled if the Received Power Over Thermal (RpOT) is greater than or equal to the maximum Received Power Over Thermal $RpOT_{max}$.

16. A method of reverse link power control, comprising:
transmitting a packet;
determining whether the packet has been received without error;
decreasing an effective carrier-to-interference (C/I) setpoint if the packet has been received without error; and
increasing the effective C/I setpoint if the packet has not been received without error,
wherein the determining, decreasing and increasing steps comprise an outer loop power control, and
wherein the outer loop power control is enabled if the Received Power Over Thermal (RpOT) is greater than the minimum Received Power Over Thermal ($RpOT_{min}$) and the Received Power Over Thermal (RpOT) is less than the maximum Received Power Over Thermal $RpOT_{max}$.

17. A wireless communications device, comprising:
means for transmitting a packet;
means for determining whether the packet has been received without error;
means for decreasing an effective carrier-to-interference (C/I) setpoint if the packet has been received without error;
means for increasing the effective C/I setpoint if the packet has not been received without error; and
means for regulating the transmit (TX) power based on a Received Power Over Thermal (RpOT) and the effective C/I setpoint.

18. A wireless communications device, comprising:
means for transmitting a packet;
means for determining whether the packet has been received without error;
means for decreasing an effective carrier-to-interference (C/I) setpoint if the packet has been received without error;
means for increasing the effective C/I setpoint if the packet has not been received without error; and
means for determining whether a Received Power Over Thermal (RpOT) is greater than a maximum Received Power Over Thermal ($RpOT_{max}$).

19. The wireless communications device of claim 18, further comprising issuing a down command if the RpOT is greater than the $RpOT_{max}$.

20. A processor programmed to execute a method of estimating interference in a wireless communication system, the method comprising:
transmitting a packet;
determining whether the packet has been received without error;

decreasing an effective carrier-to-interference (C/I) setpoint if the packet has been received without error;

increasing the effective C/I setpoint if the packet has not been received without error; and regulating the transmit (TX) power based on a Received Power Over Thermal (RpOT) and the effective C/I setpoint.

21. A processor programmed to execute a method of estimating interference in a wireless communication system, the method comprising:

transmitting a packet;

determining whether the packet has been received without error;

decreasing an effective carrier-to-interference (C/I) setpoint if the packet has been received without error;

increasing the effective C/I setpoint if the packet has not been received without error; and determining whether a Received Power Over Thermal (RpOT) is greater than a maximum Received Power Over Thermal ($RpOT_{max}$).

22. The processor of claim 21, wherein the method further comprises issuing a down command if the RpOT is greater than the $RpOT_{max}$.

23. A computer readable media embodying a method of reverse link power control, the method comprising:

transmitting a packet;

determining whether the packet has been received without error;

decreasing an effective carrier-to-interference (C/I) setpoint if the packet has been received without error;

increasing the effective C/I setpoint if the packet has not been received without error;and regulating the transmit (TX) power based on a Received Power Over Thermal (RpOT) and the effective C/I setpoint.

24. A computer readable media embodying a method of reverse link power control, the method comprising:

transmitting a packet;

determining whether the racket has been received without error;

decreasing an effective carrier-to-interference (C/I) setpoint if the packet has been received without error;

increasing the effective C/I setpoint if the packet has not been received without error; and determining whether a Received Power Over Thermal (RpOT) is greater than a maximum Received Power Over Thermal ($RpOT_{max}$).

25. The computer readable media of claim 24, embodying a method of reverse link power control, the method further comprising issuing a down command if the RpOT is greater than the $RpOT_{max}$.

* * * * *

UNITED STATES PATENT AND TRADEMARK OFFICE
CERTIFICATE OF CORRECTION

PATENT NO. : 7,594,151 B2
APPLICATION NO. : 11/022348
DATED : September 22, 2009
INVENTOR(S) : Sutivong et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 826 days.

Signed and Sealed this

Twenty-eighth Day of September, 2010

David J. Kappos
*Director of the United States Patent and Trademark Office*